United States Patent Office 3,309,243
Patented Mar. 14, 1967

3,309,243
GAS-SHIELDED ARC WELDING OF 18%
NICKEL STEEL
Donald A. Corrigan, Cambridge, Mass., assignor to The
International Nickel Company, Inc., New York, N.Y.,
a corporation of Delaware
No Drawing. Filed Mar. 26, 1964, Ser. No. 355,085
2 Claims. (Cl. 148—127)

The present invention relates to the gas-shielded arc welding of maraging steel and, more particularly, to a special welding material for producing sound welds having high toughness in maraging steel.

The maraging steels containing about 18% nickel are of great interest as structural materials for critical components. Such steels develop a very high usable strength and are characterized by ease of fabrication which has led to their rapid acceptance in engineering design. The steels are particularly adapted for the construction of massive, minimum weight structures and the use of such materials in the field has resulted in the production of structures which were not feasible with prior art materials. Because of the high strength level which can be obtained in the 18% nickel maraging steels, the welding of these materials becomes of even more critical importance than in the case in lower strength materials and it is essential that welds produced in the maraging steels be sound, be free from porosity and cracking and have acceptable toughness.

The 18% nickel maraging steels have already been classified in terms of usable properties. A convenient means for classifying the steels is in terms of the yield strength developed therein in the maraged condition. The present invention is particularly directed to the welding of the "200" grade maraging steel which contains nominally about 18% nickel, about 8.5% cobalt, about 3.2% molybdenum, about 0.1% aluminum, about 0.2% titanium and the balance essentially iron. This material in the maraged condition, e.g., after a maraging heat treatment for three hours at 900° F., has a yield strength of about 200 Ksi (thousands of pounds per square inch) with an ultimate tensile strength of about 210 Ksi, an elongation of about 15%, a reduction in area of about 60% and with a Charpy V-notch impact at 70° F. of about 50 ft.-lbs.

A welding material, e.g., a weld filler wire, for welding the "200" grade maraging steel to produce sound, tough welds when employed in the inert gas-shielded arc welding process has now been discovered.

It is an object of the present invention to provide a welding material for welding the "200" grade maraging steel by the inert gas-shielded arc welding process.

It is a further object of the present invention to provide a method for welding the "200" grade maraging steel to produce sound, tough welds therein by means of the inert gas-shielded arc welding process.

Other objects and advantages of the invention will become apparent from the following description:

Broadly stated, the present invention is directed to a welding material for welding "200" grade maraging steel which welding material comprises about 17.5% to 18.5% nickel, about 1% to about 4% or 5% molybdenum, at least about 0.35% to about 0.8% or 1% titanium, up to about 1.2% cobalt, up to about 0.5% aluminum and the balance essentially iron.

In preparing the welding material for use as a filler wire in the inert gas-shielded arc welding process in accordance with the present invention, the contents of molybdenum and titanium employed therein are very important. Thus, the molybdenum content must be at least about 1% since below this molybdenum level weld hot cracking is encountered. On the other hand, the molybdenum content must not exceed about 5% as otherwise the toughness of the resulting weld deposit is decreased. The titanium content is at least about 0.35% to avoid weld porosity but does not exceed about 0.8% or about 1% as weld embrittlement and hot cracking are encountered above this titanium level. The nickel content is maintained in the range of about 17.5% to 18.5% so that, in combination with the other ingredients in the welding material, the metal of the weld deposit will undergo the maraging reaction and further so that the cracking of the weld will be minimized. That is, at lower nickel levels, a hypersensitivity to the embrittling effects of hydrogen is encountered. With higher amounts, the austenite-to-martensite transformation temperature is decreased, with a resulting loss in maraging response on cooling to room temperature. Aluminum is a helpful supplementary hardener which also acts as a grain refiner in the weld metal deposit and contributes to toughness therein. Cobalt is not essential in the welding material but may be present in small amounts, e.g., about 1%, to act as a supplementary hardener. The contents of manganese, silicon and boron in the welding material should be kept as low as possible. Thus, the manganese content should not exceed about 0.2%, the silicon content should not exceed about 0.3% and the boron content should not exceed about 0.01% because greater amounts of manganese tend to stabilize austenite in, and undesirably depress the transformation temperature of, the weld deposit, and greater amounts of silicon and boron embrittle, induce hot cracking, and lower the tolerance of the weld deposit for other detrimental impurities such as sulfur. Even more advantageously, for the foregoing reasons, the manganese and silicon contents are controlled so as not to exceed about 0.1% each and the boron content is maintained as low as possible. The carbon content of the welding material should be as low as possible, i.e., not over 0.1% and, more advantageously, not over 0.03%, e.g., 0.01%, as carbon deleteriously affects weld toughness. In addition, the gas contents of the welding material should be very low. Thus, the hydrogen content should not exceed 5 p.p.m. and the oxygen content should not exceed about 150 p.p.m. Hydrogen in the welding material should be as low as possible to avoid embrittlement and cold cracking in the weld deposit, while the oxygen content should be controlled because of its adverse effect on weld soundness and toughness.

Inert gas-shielded arc welding deposits produced by means of the present invention will have a Charpy V-notch impact value on the order of 20 to 25 ft.-lbs. and will have a yield strength on the order of about 180 Ksi or higher together with satisfactory room temperature ductility values in the maraged condition. A very satisfactory filler wire composition in accordance with the present invention comprises about 18% nickel, about 1% cobalt, about 3.5% molybdenum, about 0.5% titanium, about 0.15% aluminum, balance essentially iron.

Advantageously, helium or argon of low dew point is employed as the shielding gas. A vacuum also produces a satisfactory shielding atmosphere. Atmospheres containing carbon dioxide while operable, should be avoided as such atmospheres markedly increase the oxygen content of the weld deposit, interfere with the recovery of titanium therein, and impair weld toughness and ductility.

Weld deposits produced in accordance with the present invention respond to the same maraging treatment employed in the heat treatment of "200" grade maraging steel. Thus, a satisfactory maraging heat treatment comprises heating in the temperature range of about 850° F. to about 1000° F. for a time period of about 1 to 3 hours. A very advantageous maraging heat treatment comprises heating at 900° F. for 3 hours.

Generally speaking, large engineering structures produced by welding may not be subjected for practical reasons to a high temperature heat treatment. It is found that high temperature heat treatments prior to maraging, e.g., heating at about 1800° F. to about 2150° F. for about ½ to 1½ hours improves the toughness, strength and ductility of maraged weld deposits produced in accordance with the invention. This improvement apparently is associated with reduction of microsegregation which causes localized retention of austentite pools, which do not marage, within the weld deposits.

In order to give those skilled in the art a better understanding of the invention and a better appreciation of the advantages of the invention, the following illustrative examples are hereinafter set forth.

*Example I*

Two heats of filler metal in accordance with the invention were produced and metal therefrom was drawn into wire of 0.062" diameter and 0.035" diameter. The compositions of the alloys are given in the following table:

TABLE I
Filler Wire Composition (Wt. Percent)

| Element | Alloy No. 1 | Alloy No. 2 |
|---|---|---|
| Iron | Balance | Balance |
| Nickel | 17.8 | 17.9 |
| Cobalt | 1.16 | 0.97 |
| Molybdenum | 3.48 | 3.33 |
| Aluminum | 0.15 | 0.10 |
| Titanium | 0.33 | 0.44 |
| Carbon | 0.005 | 0.007 |
| Phosphorus | 0.001 | 0.001 |
| Sulfur | 0.0010 | 0.0013 |
| Boron | <0.001 | <0.001 |
| Oxygen, p.p.m. | 39 | 26 |
| Hydrogen, p.p.m. | 2.1 | 3.2 |

The 0.062" diameter filler wire from each of Alloys 1 and 2 was employed to produce butt welds in ½" 200 grade maraging steel plate. The plate contained about 18% nickel, about 8.5% cobalt, about 3.2% molybdenum, about 0.1% aluminum, about 0.2% titanium and the balance essentially iron and had a yield strength of about 200 Ksi in the maraged condition. The joint in each case was prepared as an 80° single V groove with a 1/16" root face and a 1/16" root gap. The groove in each case was filled in four passes at 320 amperes and 32 volts with a travel speed of 10 inches per minute and using 50 cubic feet per hour of argon shielding gas. The properties of the resulting welds are given in the following Table II:

TABLE II

| Alloy No. | Y.S. (Ksi) | U.T.S. (Ksi) | Percent Elong. (1.4") | Percent R.A. | Charpy V-notch at 70° F. (Ft.-Lb.) |
|---|---|---|---|---|---|
| 1 | 184 | 192 | 6 | 30 | 20 |
| 2 | 186 | 192 | 8 | 37 | 23 |

NOTE: The tensile values given in Table II are an average of duplicate transverse tests including the weld. The Charpy bars were notched in the weld metal and perpendicular to the plate surface. These bars were 10 millimeters square, had a notch depth of 2 millimeters and had a radius at the base of the notch of 0.010"±0.001". All of the test bars were aged at 900° F. for 3 hours after welding.

*Example II*

0.062" diameter filler wire from Alloy 2 was employed to produce a butt weld in a 1" thick "200" grade maraging steel plate. The joint design comprised a 30° single-groove with a ¼" radius, a 1/16" root face and a 1/16" root gap. The weld consisted of 13 beads laid down at a welding current of 300 amperes at 30 volts using a travel speed of 10 inches per minute and a shielding atmosphere of argon gas supplied at a rate of 50 cubic feet per hour. The resulting weld was maraged and was subjected to transverse tensile and impact tests in the same manner as given in Example I. Transverse tensile tests including the weld provided a yield strength of 176 Ksi and an ultimate tensile strength of 181 Ksi, 6.3% elongation in 2", and 25% reduction in area. A Charpy V-notch value of 26 ft.-lbs. was obtained in the weld metal using a speciment prepared as described in Example I.

*Example III*

Filler wire having a diameter of 0.035" from Alloy No 1 was employed to produce a butt weld in ½" thick "200" grade maraging steel plate using the "shorting-arc" process. The joint design comprised an 80° single-V groove, a 1/16" root face and a 1/16" root gap. The joint was laid down in 10 passes using 140 amperes welding current at 26 volts, employing a 24 inch per minute travel speed and 50 cubic feet per hour of shielding helium. The resulting weld was maraged and was subjected to tensile and impact tests in the same manner as given in Example I with the results set forth in the following Table III:

TABLE III

| Alloy No. | Y.S. (Ksi) | U.T.S. (Ksi) | Percent Elong. (1.4") | Percent R.A. | Charpy V-notch Impact at 70° F. (Ft.-Lbs.) |
|---|---|---|---|---|---|
| 1 | 183 | 189 | 10 | 32 | 24 |

*Example IV*

For the purpose of demonstrating the effects of eliminating characteristic retained austenite of maraging steel welds, specimens from the weld produced employing the Alloy No. 1 filler material in accordance with Example I were subjected to a homogenizing heat treatment comprising heating at 2100° F. for 1 hour, a further heating at 1500° F. for 1 hour followed by a maraging heat treatment at 900° F. for 3 hours. The specimens were subjected to transverse tensile tests and impact tests in the same manner as given in Example I. The results of the testing are given in the following Table IV:

TABLE IV

| Alloy No. | Post-Weld Heat Treatment | Y.S. (Ksi) | U.T.S. (Ksi) | Percent Elong. (1") | Percent R.A. | Charpy V-notch Impact at 70° F. (Ft.-Lbs.) |
|---|---|---|---|---|---|---|
| 1 | 900° F./3 Hrs. | 185 | 193 | 14 | 48 | 26 |
| 1 | 2,100° F./1 Hr.+ 1,500° F./1 Hr.+ 900° F./3 Hrs. | 183 | 187 | 12 | 55 | 41 |

These results clearly demonstrate the degree of toughness inherent in these welds, which may be realized by homogenizing the weldment whenever and wherever practicable, or approached by employing welding procedures that minimize the formation of austenite, i.e., procedures that deposit many small beads to favor grain refinement, or those employing an autogenous (no filler addition) reheat pass at lower current levels between filler passes, which procedures have a beneficial homogenizing effect.

Successful welds are also readily obtainable when the special filler metal provided in accordance with the invention is employed in the welding of sheet material made of the "200" grade maraging steel.

As noted hereinbefore, the present invention is particularly applicable to the welding and overlaying of elements produced in the "200" grade of maraging steel. The data set forth hereinbefore demonstrate that in accordance with the invention welds are produced having essentially 90% of the strength of the base material. In addition, the welds produced are sound, free from porosity and cracking and have a desired level of toughness.

The filler wire provided in accordance with the invention is useful as such in inert atmosphere shielded fusion-welding processes including metal-arc and tungsten-arc welding processes. It will be appreciated that very thin proprietary emissive coatings which are commercially employed on bare filler wires to promote arc stability and which are almost invisible may be employed with the filler wire provided in accordance with this invention. It will also be understood that a vacuum as well as helium and argon will provide an inert atmosphere.

The present invention includes within its scope the maraging steel composition described hereinbefore in terms of its special utility as a welding filler wire for inert gas arc-welding particularly for maraging steels. As disclosed herein, the maraging steel composition of the invention provides a combination of substantial strength, toughness and ductility in maraged weld deposits. In the wrought form, e.g., plate, tubing, etc., the special maraging steel provided in accordance with the invention provides even higher combinations of strength, toughness and ductility as those skilled in the art will readily appreciate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The method for joining by welding base members made of a maraging steel composition containing nominally about 18% nickel, about 8.5% cobalt, about 3.2% molybdenum, about 0.1% aluminum, about 0.2% titanium and the balance essentially iron which comprises melting in an inert gas-shielded arc, a filler material consisting essentially of about 17.5% to 18.5% nickel, about 1% to about 5% molybdenum, at least about 0.35% to about 1% titanium, up to about 1.2% cobalt, up to about 0.5% aluminum, not more than 0.1% carbon and the balance essentially iron to form a weld deposit joining said members and subjecting the weld assembly to a maraging heat treatment at about 850° F. to about 1000° F. for up to about three hours to provide a weld assembly having a high combination of strength and toughness wherein the weld has essentially about 90% of the strength of the base members.

2. The method according to claim 1 wherein the weld deposit is subjected to a homogenizing heat treatment at a temperature of about 1800° F. to about 2150° F. for about one-half to about one and one-half hours prior to maraging.

References Cited by the Examiner

UNITED STATES PATENTS

| | | | |
|---|---|---|---|
| 2,032,977 | 3/1936 | Delachaux | 148—127 |
| 2,732,323 | 1/1956 | Linnert | 148—127 |
| 3,093,519 | 6/1963 | Decker et al. | 75—123 X |
| 3,192,079 | 6/1965 | Takagi et al. | 148—127 |
| 3,222,165 | 12/1965 | Bird et al. | 75—171 |

DAVID L. RECK, *Primary Examiner.*

HYLAND BIZOT, C. N. LOVELL, *Assistant Examiners.*